United States Patent
Tsai et al.

(10) Patent No.: US 10,802,274 B2
(45) Date of Patent: Oct. 13, 2020

(54) TRANSPARENT DISPLAY SYSTEM AND OPERATION METHOD THEREOF

(71) Applicants: Industrial Technology Research Institute, Hsinchu (TW); Intellectual Property Innovation Corporation, Hsinchu (TW)

(72) Inventors: Yu-Tang Tsai, New Taipei (TW); Shin-Hong Kuo, New Taipei (TW); Yi-Shou Tsai, Hsinchu (TW); Yi-Hsiang Huang, Changhua County (TW); Wei-Lung Tsai, Tainan (TW); Kuan-Ting Chen, Yunlin County (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 0 days.

(21) Appl. No.: 16/361,185

(22) Filed: Mar. 21, 2019

(65) Prior Publication Data
US 2020/0166747 A1  May 28, 2020

(30) Foreign Application Priority Data
Nov. 22, 2018 (TW) .............................. 107141563 A

(51) Int. Cl.
*G02B 27/01* (2006.01)
*G09G 3/32* (2016.01)
(Continued)

(52) U.S. Cl.
CPC ....... *G02B 27/0101* (2013.01); *G09G 3/2003* (2013.01); *G09G 5/026* (2013.01);
(Continued)

(58) Field of Classification Search
CPC combination set(s) only.
See application file for complete search history.

(56) References Cited

U.S. PATENT DOCUMENTS 9,916,635 B2    3/2018  Kim et al.
9,979,952 B2 *  5/2018  Lee ........................... G06T 7/11
(Continued)

FOREIGN PATENT DOCUMENTS

CN    101594427    12/2009
CN    103489412    1/2014
(Continued)

OTHER PUBLICATIONS

"Office Action of Taiwan Counterpart Application," dated Aug. 14, 2019, p. 1-p. 9.

*Primary Examiner* — Wesner Sajous
(74) *Attorney, Agent, or Firm* — JCIPRNET

(57) ABSTRACT

A transparent display system including a transparent display and a computation module is provided. The computation module is coupled to the transparent display. The computation module determines whether a display image displayed on the transparent display can be recognized based on display information and background information. If it is determined that the recognizability of the display image is poor, the haze of the background image displayed on the transparent display is adjusted. An operation method of the transparent display system is also provided.

20 Claims, 14 Drawing Sheets

(51) Int. Cl.
*G09G 5/37* (2006.01)
*G09G 5/38* (2006.01)
*G09G 3/20* (2006.01)
*G09G 5/02* (2006.01)
*H04N 5/57* (2006.01)
*H04N 9/64* (2006.01)
*G09G 5/10* (2006.01)
*G09G 5/373* (2006.01)
*G09G 3/3208* (2016.01)

(52) U.S. Cl.
CPC ......... *G09G 5/10* (2013.01); *G02B 2027/014* (2013.01); *G02B 2027/0118* (2013.01); *G09G 3/3208* (2013.01); *G09G 5/373* (2013.01); *G09G 5/38* (2013.01); *G09G 2320/066* (2013.01); *G09G 2320/0666* (2013.01); *G09G 2320/0686* (2013.01); *G09G 2360/16* (2013.01)

(56) References Cited

U.S. PATENT DOCUMENTS

| | | |
|---|---|---|
| 2013/0314453 A1 | 11/2013 | Ko |
| 2014/0104316 A1 | 4/2014 | Sharma et al. |
| 2014/0204023 A1 | 7/2014 | Kumar et al. |
| 2015/0293654 A1* | 10/2015 | Cho ............... G06F 3/04897 715/768 |
| 2016/0351164 A1 | 12/2016 | Hsieh et al. |
| 2017/0163937 A1* | 6/2017 | McNelley ............ H04N 7/15 |
| 2018/0145937 A1* | 5/2018 | Choi ............... H04L 51/046 |
| 2019/0033504 A1* | 1/2019 | Miyata ............... G02B 5/26 |
| 2019/0042871 A1* | 2/2019 | Pogorelik ......... H04N 5/23219 |
| 2019/0057255 A1* | 2/2019 | Kuo ............... G06T 11/203 |

FOREIGN PATENT DOCUMENTS

| | | |
|---|---|---|
| TW | 393582 | 6/2000 |
| TW | 201349209 | 12/2013 |
| TW | I622925 | 5/2018 |

* cited by examiner

TRANSPARENT DISPLAY SYSTEM AND OPERATION METHOD THEREOF

CROSS-REFERENCE TO RELATED APPLICATION

This application claims the priority benefit of Taiwan application serial no. 107141563, filed on Nov. 22, 2018. The entirety of the above-mentioned patent application is hereby incorporated by reference herein.

BACKGROUND

Technical Field

The disclosure relates to a transparent display system and an operation method thereof.

Description of Related Art

Since a transparent display itself has a certain degree of transmittance, it allows the user to see the background on the other side of the transparent display relative to the user while outputting a display image. Based on this transparent property, transparent displays are widely used in various fields as, for example, building windows, automobile windows, or shop windows.

When a background image and the display image are simultaneously displayed on the transparent display, the display image overlays the background image. When background luminance is too high or when the background image is too complicated, the display image may not be clearly visible. Therefore, improvement of the recognizability of the display image has become one of the problems that researchers in this field are eager to solve.

SUMMARY

A transparent display system according to an embodiment of the disclosure includes a transparent display and a computation module. The computation module is coupled to the transparent display. The computation module determines whether the display image displayed on the transparent display can be recognized based on display information and background information. Results of determining whether the display image can be recognized include determining that recognizability of the display image is poor (for example, the display image cannot be recognized or the display image is not easily recognized) and determining that the display image can be recognized. If it is determined that the recognizability of the display image is poor, a haze of a background image displayed on the transparent display is adjusted.

An operation method of a transparent display system according to an embodiment of the disclosure includes the following steps: capturing display information and background information; determining whether a display image displayed on a transparent display can be recognized based on the display information and the background information; outputting the display image if it is determined that the display image can be recognized; and adjusting a haze of a background image displayed on the transparent display if it is determined that recognizability of the display image is poor.

In order to make the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
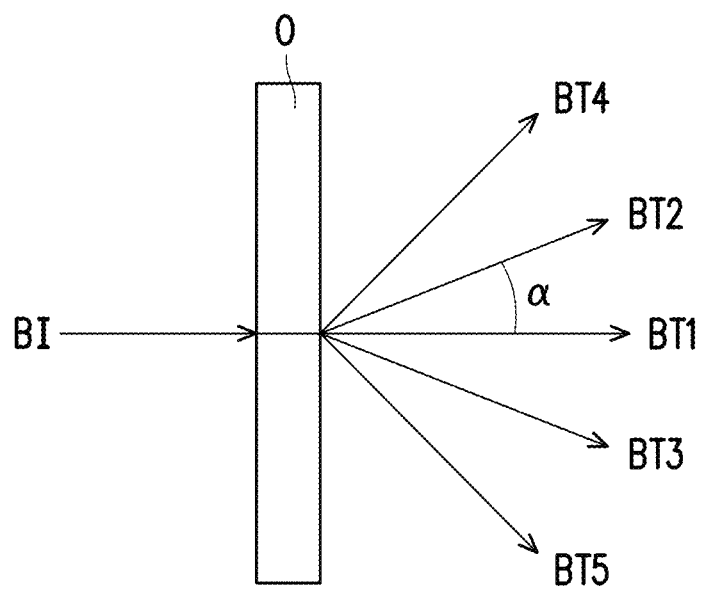
FIG. 1 is a schematic diagram for explaining the haze.

In the following embodiments, wordings used to indicate directions, such as "up," "down," "front," "back," "left," and "right," merely refer to directions in the accompanying drawings. Therefore, the directional wordings are used to illustrate rather than limit the disclosure. In the accompanying drawings, the drawings illustrate the general features of the methods, structures, and/or materials used in the particular exemplary embodiments. However, the drawings shall not be interpreted as defining or limiting the scope or nature covered by the exemplary embodiments. For example, the relative thickness and location of layers, regions, and/or structures may be reduced or enlarged for clarity.

In the embodiments, the same or similar elements will be designated by the same or similar reference numerals, and descriptions thereof will be omitted. In addition, the features of different exemplary embodiments may be combined with each other when they are not in conflict, and simple equivalent changes and modifications made according to the specification or the claims are still within the scope of the disclosure. In addition, the terms such as "first" and "second" mentioned in the specification or the claims are only used to name discrete elements or to distinguish different embodiments or scopes and are not intended to limit the upper or lower limit of the number of the elements, nor are they intended to limit the manufacturing order or disposition order of the elements.

In general, a "haze" may be defined as the percentage of the intensity of transmissive light deviating from incident light by an angle of 2.5° or more to the intensity of the total transmissive light. FIG. 1 is a schematic diagram for explaining the haze. Taking FIG. 1 as an example, in transmissive light that passes through an object O, such as transmissive light BT1, transmissive light BT2, transmissive light BT3, transmissive light BT4, and transmissive light BT5, the transmissive light BT1 is transmitted along the transmission path of incident light BI; that is, the deviation angle α of the transmissive light BT1 is 0. On the other hand, the deviation angles α of the transmissive light BT2, the transmissive light BT3, the transmissive light BT4, and the transmissive light BT5 are all greater than 2.5°, for example. In FIG. 1, the percentage of the sum of the intensities of light with the deviation angles α greater than 2.5° to the total light intensity of the incident light BI is the haze of the object O.

A transparent display usually refers to a display which has a certain degree of light transmittance and allows the user to see a background on the other side relative to the user through the transparent display while outputting the display image. In other words, the user can simultaneously see a background image and a display image. In the disclosure, the "background image" refers to the background image which is on the other side relative to the user and is seen by the user through the transparent display, and the "display image" refers to a non-background image which does not appear on the other side relative to the user and is seen by the user on the transparent display. The display image may include, for example, texts and/or graphics. The background image and the display image each have display parameters such as luminance, size, position, and haze. Hereinafter, the display parameters of the background image are referred to as background information, and the display parameters of the display image are referred to as display information.

Figure 2:
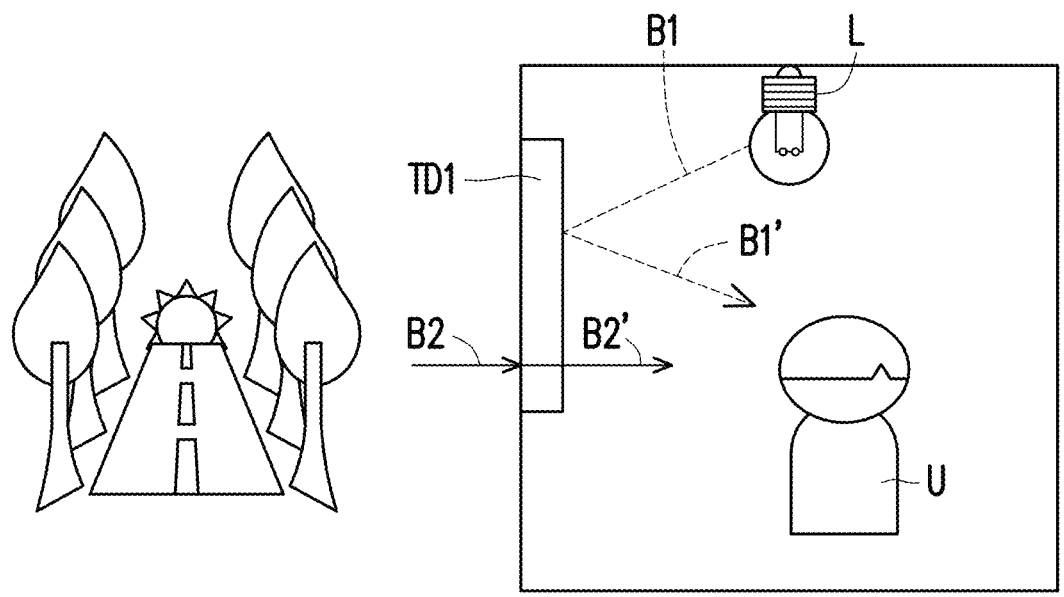
FIG. 2 is a schematic diagram of a field where a transparent display is applied.
Figure 3:
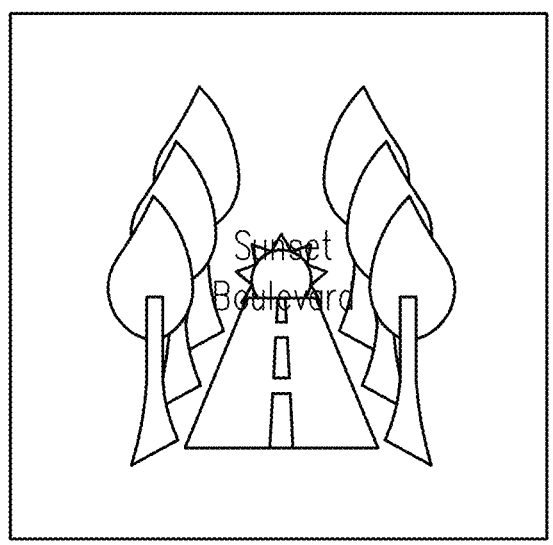
FIG. 3 is a schematic diagram of an image displayed by the transparent display of FIG. 2.

FIG. 2 is a schematic diagram of a field where the transparent display is applied. FIG. 3 is a schematic diagram of an image displayed by the transparent display of FIG. 2. In FIGS. 2 and 3, a transparent display TD1 may be used, for example, as a building window. With the light transmitting property of the transparent display TD1, the user U can simultaneously see the display image (such as the text "Sunset Boulevard") and the background image (such as the boulevard, the trees and the sun) on the other side relative to the user on the transparent display TD1 while standing in the building.

In the disclosure, "information luminance" refers to the luminance of the display image, and "field luminance" refers to foreground reflection light luminance and background transmissive light luminance. The foreground reflection light luminance is the luminance of a foreground light beam reflected by the transparent display, and the background transmissive light luminance is the luminance of a background light beam passing through the transparent display. Taking FIG. 2 as an example, an indoor illumination L emits a light beam B1. The luminance of a light beam B1' reflected by the transparent display TD1 is the foreground reflection light luminance. The foreground reflection light luminance may be measured by a light detecting device such as a light detector, a colorimeter, a luminance meter, a spectrometer or an image capture device. The foreground reflection light luminance may be obtained by capturing the luminance of indoor ambient light by the above-described light detecting device and then by computing by a computation module (for example, by multiplying the luminance obtained by the above-described light detecting device by the reflectivity of the transparent display TD1). Alternatively, the luminance of the light beam B1' reflected by the transparent display TD1 may be directly captured by the above-described light detecting device.

A background light beam B2 from the other side of the transparent display TD1 relative to the user may enter indoors through the transparent display TD1 so that the user can see the background image through the transparent display TD1. The luminance of the light beam B2' output from the background image of the transparent display TD1 is the above-described background transmissive light luminance (also referred to as background luminance). The background luminance may be measured by photographing the background image displayed on the transparent display TD1 from the side where the user U is located by the above-described light detecting device. Alternatively, the background luminance may be obtained by photographing the background outdoors by the above-described light detecting device and then by computing by the computation module (for example, by multiplying the luminance obtained by the above-described light detecting device by the transmittance of the transparent display TD1). In one embodiment, the background image on the transparent display TD1 may be photographed by the image capture device, and target object recognition technology may be used to find the image of a target object from the background image photographed by the image capture device. Then, a luminance data capture is performed for a region to be displayed of the display image. In other words, the background luminance of the entire transparent display TD1 may be captured, or only the background luminance of the region to be displayed of the display image may be captured.

Since the display image and the background image can be overlaid, the background image displayed on the transparent display may affect the difficulty of the display image recognition. For example, when the background luminance is too high or when the background image is too complicated, the display image may not be clearly visible. Taking FIG. 3 as an example, the luminance of the sun in the background image displayed on the transparent display is very high, and the display image overlapping the sun (such as the text "Sunset Boulevard") may not be completely clearly recognized or may not even be visible.

In order to allow the user to see the display image clearly, the disclosure provides a transparent display system, which can improve the recognizability of the display image by adjusting the haze of the background image displayed on the transparent display when determining that the recognizability of the display image is poor. In addition, the disclosure also provides an operation method of a transparent display system, which can determine whether the haze of the background image displayed on the transparent display needs to be adjusted to improve the recognizability of the display image.

In the disclosure, poor recognizability refers to a phenomenon in which the time lapse for image focusing by the user is too long, or the foreground image is poor, or the background image is poor, or the foreground and background images are confused, etc.

Figure 4:
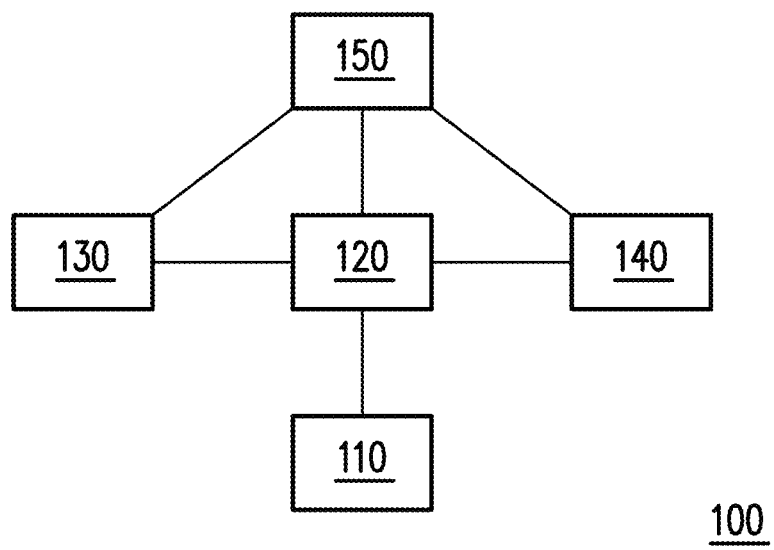
FIG. 4 is a schematic diagram of a transparent display system according to one embodiment of the disclosure.

FIG. 4 is a schematic diagram of a transparent display system according to one embodiment of the disclosure. With reference to FIG. 4, a transparent display system 100 includes a transparent display 110 and a computation module 120.

The transparent display 110 allows the user to see the background on the other side relative to the user through the transparent display 110. For example, the transparent display 110 may be the transmissive display TD1 shown in FIG. 2. However, the application field of the transmissive display TD1 is not limited to that shown in FIG. 2. In addition to being used as a building window, the transmissive display TD1 may also be used as an automobile window, a shop window or any object that requires a light transmitting property and a display function.

The computation module 120 is coupled to the transparent display 110 for signal transmission. The coupling includes a wired connection and a wireless connection. The computation module 120 is adapted to receive the display information of the display image and the background information of the background image and to determine whether the display image displayed on the transparent display 110 can be recognized based on the display information and the background information. For example, the computation module 120 may include a central processing unit (CPU) or a graphical processing unit (GPU), but it is not limited thereto. If it is determined that the recognizability of the display image is poor, the haze of the background image displayed on the transparent display 110 is adjusted.

Figure 5:
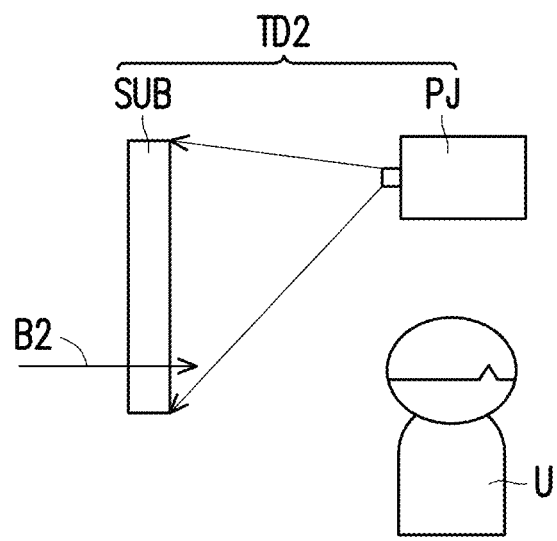
FIGS. 5 and 6 are two schematic diagrams of transparent displays that can be applied to the transparent display system of FIG. 4, respectively.
Figure 6:
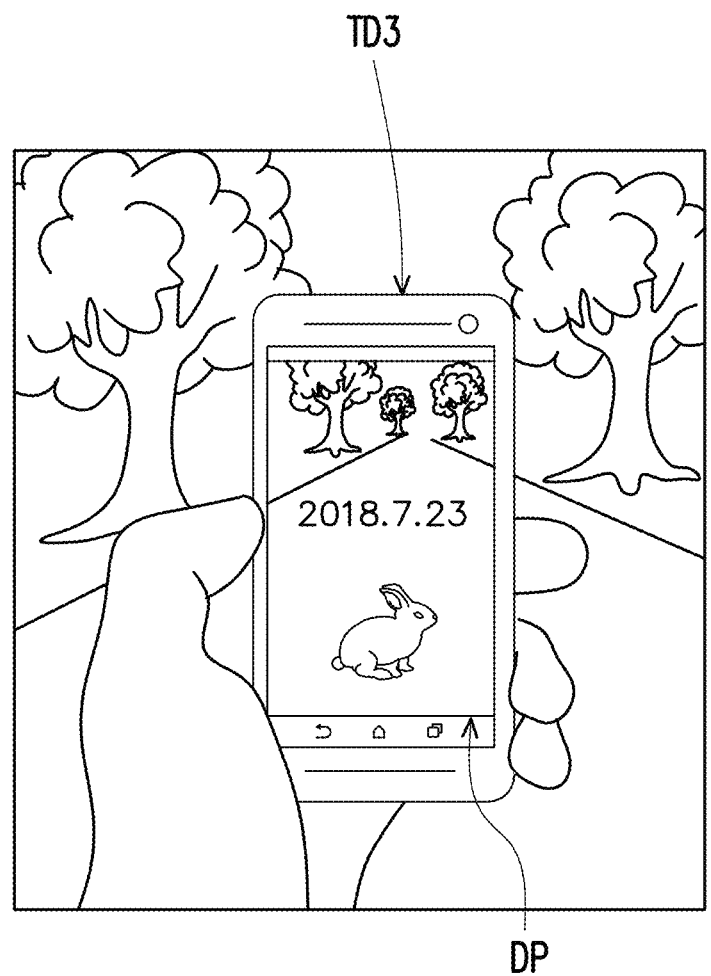

FIGS. 5 and 6 are two schematic diagrams of transparent displays that can be applied to the transparent display system of FIG. 4, respectively. As shown in FIG. 5, the transparent display 110 of the transparent display system 100 may be a projection display TD2. The projection display TD2 includes a projection device PJ and a light transmitting substrate SUB. A display image is projected onto the light transmitting substrate SUB by the projection device PJ so that the user U can see the display image. The light transmitting substrate SUB may be a substrate which allows a partial transmission and partial reflection of a light beam so as to allow a background light beam B2 from the other side of the light transmitting substrate SUB relative to the user to transmit so that the user U can simultaneously see the display image and the background image. The projection display TD2 may be used as a head-up display in an automobile, but the application field of the projection display TD2 is not limited thereto.

As shown in FIG. 6, the transparent display 110 of the transparent display system 100 may be a photographic display TD3. The photographic display TD3 includes a data capture module (such as a rear lens module, which is not shown) and a display panel DP. The photographic display TD3 may capture the background image with the data capture module and output the background image and the display image with the display panel DP. In this way, the user can simultaneously see the background image and the display image. The photographic display TD3 may be used in an augmented reality device, but the application field of the photographic display TD3 is not limited thereto.

Figure 7:
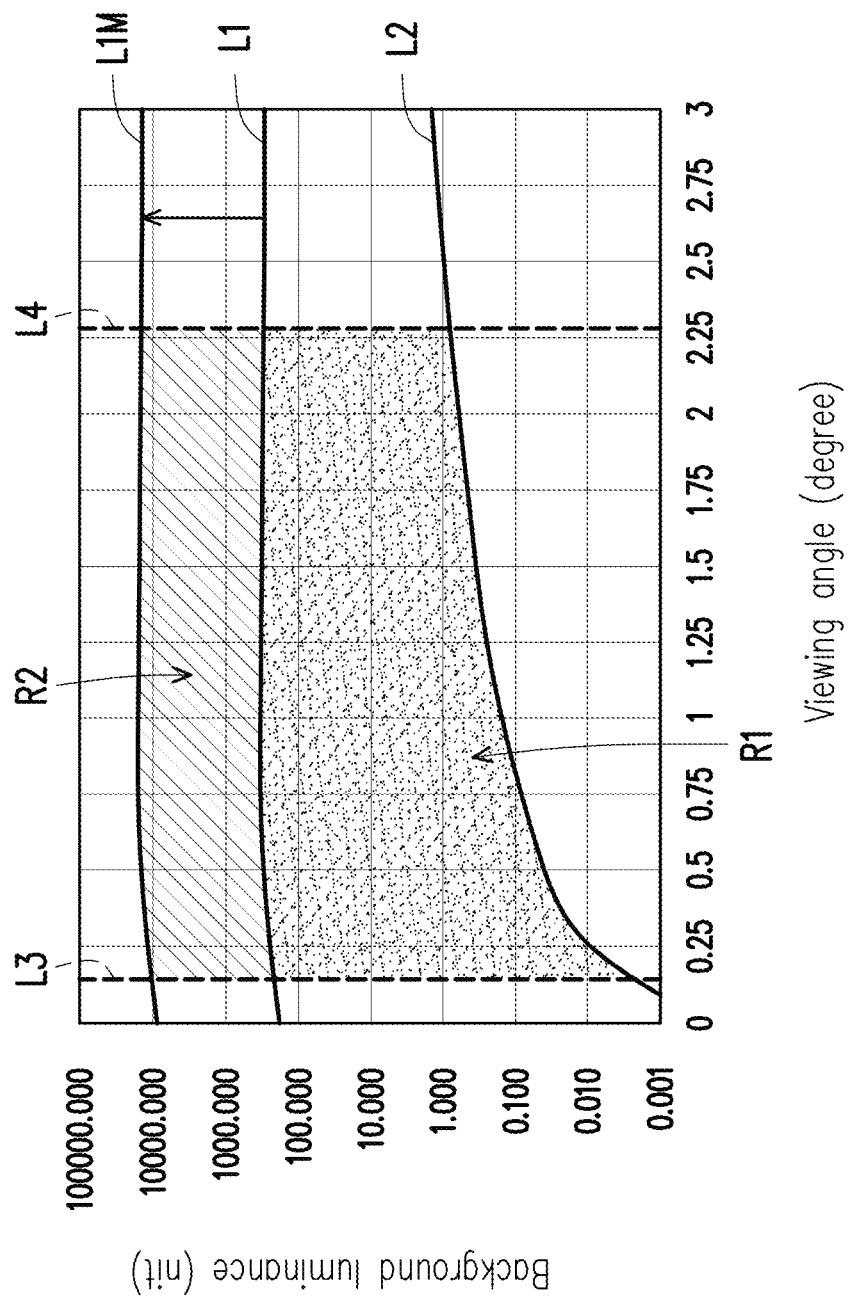
FIG. 7 is a graph of the relationship between the viewing angle and the background luminance.

In detail, whether the display image can be recognized may be related to a viewing angle of the display image (a minimum spatial resolution that can be clearly recognized by the human eye) and the background luminance of the background image. FIG. 7 is a graph of the relationship between the viewing angle and the background luminance. In FIG. 7, the dot region R1 indicates the range in which the display image can be recognized. In other words, if one of the viewing angle and the background luminance falls outside the dot region R1, it means that the display image is difficult to recognize.

Boundary conditions of the dot region R1 may be defined by the following Equation 1 and Equation 2. If one of Equation 1 and Equation 2 is not satisfied, it means that one of the viewing angle and the background luminance falls outside the dot region R1; that is, the display information is difficult to recognize.

$$0.15 \le \theta \le 2.25 \quad \text{Equation 1}$$

$$\left(\frac{\tan(\theta) \times L_i}{f(d) \times k}\right)^2 \le L_b \le L_i / \left[1.773 \times e^{-\left(\frac{\theta-13.95}{22.95}\right)^2} + 1.234 \times e^{-\left(\frac{\theta+0.2208}{0.4677}\right)^2}\right] \quad \text{Equation 2}$$

where θ is the viewing angle of the display image, and $$\theta = \tan^{-1}\left(\frac{w}{d}\right),$$

where w is the width of the display image, and d is the distance between the user and the display image. $L_i$ is the information luminance of the display image. $L_b$ is the background luminance of the background image. k falls within the range of 8.4 to 30.8. In addition, $f(d) = -0.1734 \times d^3 + 0.6648 \times d^2 + 0.6372 \times d + 0.9788$.

In detail, the viewing angle of the display image is limited by the reading limit of the human eye. In general, the reading limit of the human eye falls within the range of the viewing angle of 0.15 degrees (see the line L3 in FIGS. 7) to 2.25 degrees (see the line L4 in FIG. 7). When the size of the display information does not fall within the range of the viewing angle of 0.15 degrees to 2.25 degrees (for example, when the viewing angle is less than 0.15 degrees or greater than 2.25 degrees), it is likely to cause the display information to be difficult to read.

In addition, in FIG. 7, the line L1 and the line L2 are drawn based on $$L_b \le L_i / \left[1.773 \times e^{-\left(\frac{\theta-13.95}{22.95}\right)^2} + 1.234 \times e^{-\left(\frac{\theta+0.2208}{0.4677}\right)^2}\right] \text{ and } \left(\frac{\tan\theta \times L_i}{f(d) \times k}\right)^2 \le L_b,$$

respectively. The line L1 represents the recognition comfort limit of the human eye before the haze of the background image displayed on the transparent display is adjusted (i.e., the haze is 0). The line L2 represents the recognition limit of the human eye. When the background luminance falls between the line L1 and the line L2, the display information can be recognized by the human eye. When the background luminance falls above the line L1 and the haze of the background image displayed on the transparent display is not adjusted, the human eye is likely to feel uncomfortable (such as being glared) when recognizing the display image because the background luminance is too high. When the background luminance falls below the line L2, the human eye is likely to be unable to clearly recognize the display image because the background luminance is too low.

It should be noted that the dot region R1 in FIG. 7 is a range in which the display image can be recognized in a case where the information luminance is 400 nits. 400 nits is the maximum luminance set for a general display. However, the maximum luminance set for the display may vary depending on the types, specifications, application fields, etc. of displays. As the information luminance changes, the range of the dot region R1 in FIG. 7 will also be different. Therefore, whether the display image can be recognized shall be determined by Equation 1 and Equation 2 and is not limited to the case shown in FIG. 7.

With reference to FIGS. 4 and 7, the computation module 120 can determine whether the display image displayed on the transparent display 110 can be recognized based on whether the viewing angle and the background luminance fall within the range in which the display image can be recognized (such as the dot region R1 shown in FIG. 7). If the computation module 120 determines that the viewing angle and/or the background luminance does not fall within the range in which the display image can be recognized, the haze of the background image displayed on the transparent display 110 needs to be adjusted to improve the recognizability of the display image.

After the haze of the background image displayed on the transparent display is adjusted, the upper boundary of $L_b$ is defined by Equation 3, $$L_b \leq L_i / \left\{ \left[ 1.773 \times e^{-\left(\frac{\theta - 13.95}{22.95}\right)^2} + 1.234 \times e^{-\left(\frac{\theta + 0.2208}{0.4677}\right)^2} \right] \times [1 - H] \right\} \quad \text{Equation 3}$$

where H is the haze of the background image after the adjustment.

It can be seen from Equation 3 that the upper limit of the background luminance of the reading comfort zone of the display information increases as the haze H of the background image increases. Correspondingly, the upper boundary of the range in which the display image can be recognized in FIG. 7 (the dot region R1 shown in FIG. 7) is moved upward from a position indicated by the line L1 to a position indicated by the line L1M after the haze adjustment. In other words, by adjusting the haze H of the background image, the range in which the display image can be recognized can be effectively expanded (see the oblique line region R2 for the range expanded by the haze adjustment). In this way, in addition to improving the recognizability of the display image, the boundary range of the reading comfort is also improved, thereby achieving the effect of effectively expanding the application fields of the transparent display 110. For example, when the position of a showcase projection light in an exhibition hall overlaps the display image, when a high-luminance illumination (such as the sunrise, the sunset, street lights, tunnel exits, high beams or advertising billboards) of the background image overlaps the display image, when the display image is affected by sunlight reflection (such as water reflection, snow reflection or building glass reflection) or when the display image is affected by complicated background images (such as shop windows, refrigerators or display cases), the haze H of the background image may be adjusted to improve the recognizability and the reading comfort of the display image.

Adjusting the haze of the background image may include at least one of adjusting the haze of a haze region of the background image and adjusting the size of the haze region, and the area of the haze region is less than or equal to the area of the background image. That is, the haze effect may be added to the whole background image or partial background image. When the haze effect is added to the whole background image, the haze may be adjusted to improve the recognizability of the display image. On the other hand, when the haze effect is added to the partial background image, at least one of the haze and the size of the haze region may be adjusted to improve the recognizability of the display image, thereby achieving the effect of assisting the user to focus. In other words, since the higher the haze is, the more blurred the haze region is, the partial haze effect helps maintain the authenticity of regions outside the haze region.

A method of adjusting the haze of the background image may be adjusting the haze of the background image by an algorithm. For example, the computation module 120 may store an algorithm, and the computation module 120 may adjust at least one of the color and the grayscale of the background image displayed on the transparent display 110 based on the algorithm so that the background image has a mosaic-like effect. The display image is highlighted by increasing the chaos degree of at least a partial region of the background image (which may be regarded as blurring the background image), thereby improving the recognizability of the display image.

On the other hand, the method of adjusting the haze of the background image may be switching the transparent display 110 between a transparent state and a scattering state by hardware adjustment. Two embodiments of the transparent display 110 are described below with reference to FIGS. 8A to 8B and FIGS. 9 to 10B. However, the embodiments of the transparent display 110 are not limited to these two embodiments.

Figure 8A:
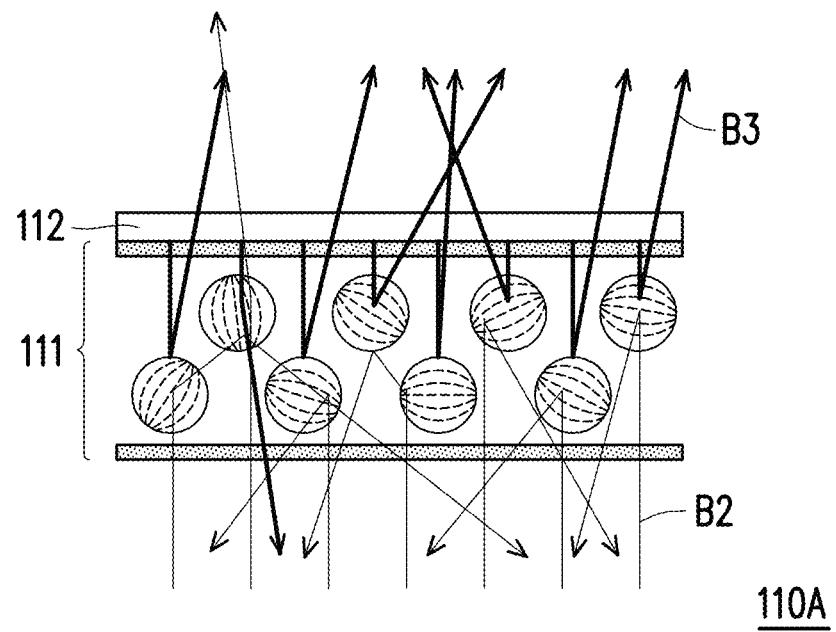
FIGS. 8A and 8B are partially enlarged cross-sectional schematic diagrams of a transparent display that can be applied to the transparent display system of FIG. 4 in the scattering state and the transparent state, respectively.
Figure 8B:
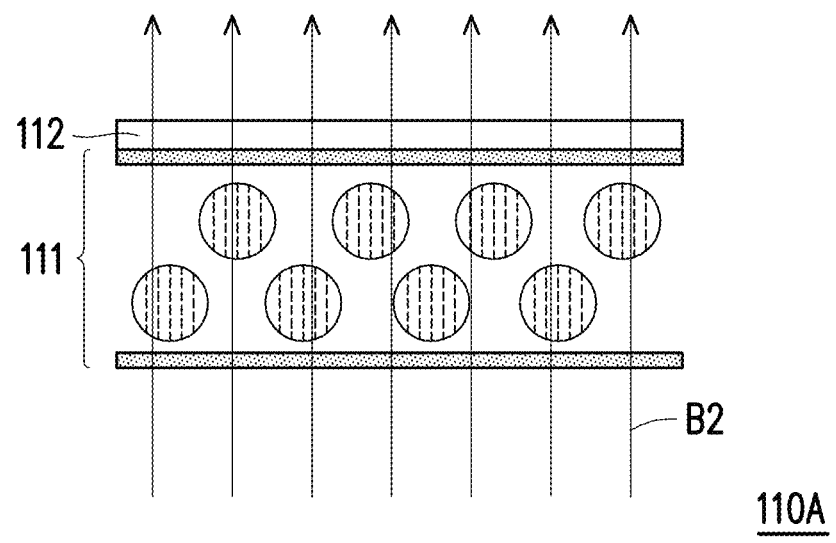

FIGS. 8A and 8B are partially enlarged cross-sectional schematic diagrams of a transparent display that can be applied to the transparent display system of FIG. 4 in the scattering state and the transparent state, respectively. With reference to FIG. 8A, a transparent display 110A includes a haze adjustable element 111 and a transmissive display panel 112. The haze adjustable element 111 may be switched between the transparent state and the scattering state by varying a voltage applied to the haze adjustable element 111. For example, the haze adjustable element 111 may include a polymer dispersed liquid crystal (PDLC), a micro-electromechanical system (MEMS) or a cholesteric liquid crystal, but it is not limited thereto.

The transmissive display panel 112 may be disposed on the haze adjustable element 111. The transmissive display panel 112 is, for example, an organic light emitting display (OLED), a light emitting diode display, or a liquid crystal display, but it is not limited thereto.

As shown in FIG. 8A, when the transmissive display panel 112 outputs a light beam B3 to generate the display image, the haze adjustable element 111 may be switched to the scattering state to improve the recognizability of the display image. For example, when the haze adjustable element 111 includes the polymer dispersed liquid crystal, the haze adjustable element 111 may be turned off (i.e., the voltage applied to the haze adjustable element 111 is 0) so that the haze adjustable element 111 is in the scattering state. In this way, a part of the background light beam B2 from the other side of the transparent display 110A can be reflected by the haze adjustable element 111, and the remainder of the background light beam B2 passes through the haze adjustable element 111 and the transmissive display panel 112 sequentially and is transmitted to the user's eyes. On the other hand, when the transmissive display panel 112 outputs the light beam B3 to generate the display image, the haze adjustable element 111 may be switched to a partial scattering and partial transmission state. For example, when the haze adjustable element 111 includes the polymer dispersed liquid crystal, the haze adjustable element 111 may be turned on (i.e., the voltage applied to the haze adjustable element 111 is not 0) so that the haze adjustable element 111 is in the partial scattering and partial transmission state. In this way, the background light beam B2 from the other side of the transparent display 110A may pass through the haze adjustable element 111 and the transmissive display panel 112 sequentially and be transmitted to the user's eyes, thereby improving the recognizability of the display image. In addition, as shown in FIG. 8B, when the display image is not output, the transmissive display panel 112 may be turned off, and the haze adjustable element 111 may be switched to the transmission state (transparent state). Further, the transmissive display panel 112 and the haze adjustable element 111 may be turned off. In other words, the haze adjustable element 111 and the transmissive display panel 112 may each be operated separately and independently. In one embodiment, different voltages may be applied to the haze adjustable element 111 so that the haze adjustable element 111 exhibits different degrees of the partial scattering and partial transmission state; that is, the haze of the haze adjustable element 111 may be adjusted by varying the voltage applied to the haze adjustable element 111.

In the embodiment, as shown in FIG. 8A, the organic light emitting display is, for example, an organic light emitting display that emits light downward (emitting the light beam B3 toward the haze adjustable element 111). In this way, the light beam B3 output from the organic light emitting display may be reflected by the haze adjustable element 111 and then emitted upward, which helps to improve the utilization of light. Alternatively, the organic light emitting display may be a double-sided light emitting type organic light emitting display.

Figure 9:
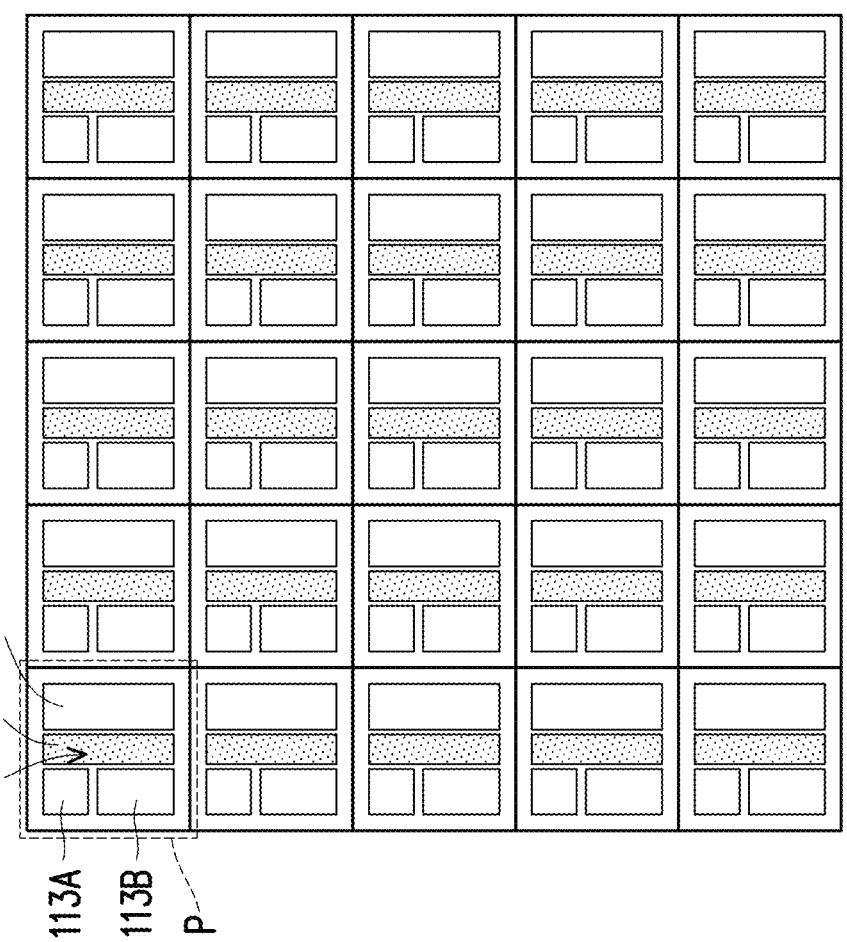
FIG. 9 is a pixel structure of a transparent display that can be applied to the transparent display system of FIG. 4.
Figure 10A:
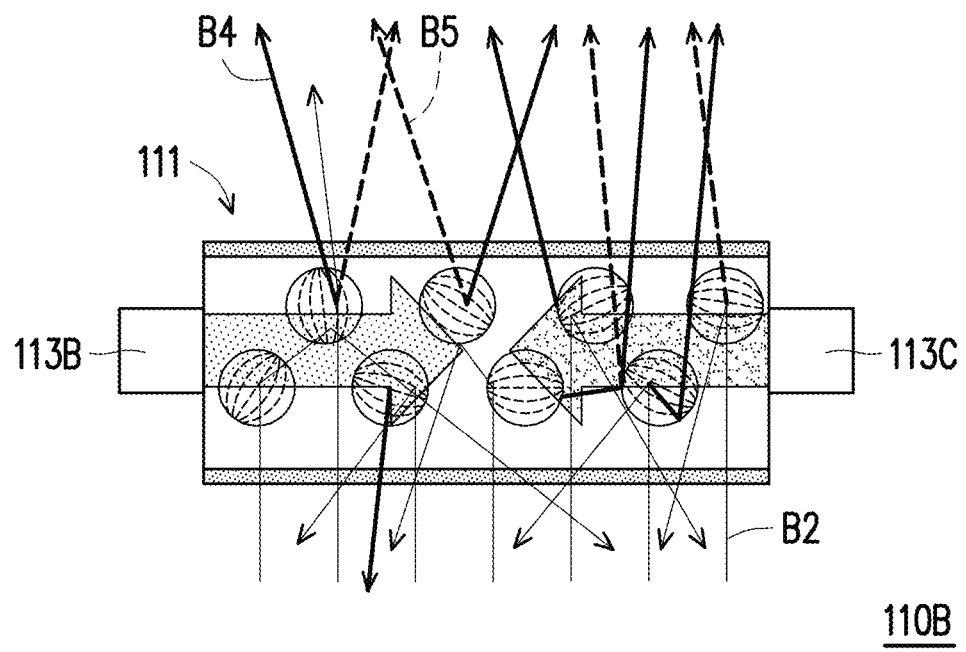
FIGS. 10A and 10B are partially enlarged cross-sectional schematic diagrams of the transparent display of FIG. 9 in the scattering state and the transparent state, respectively.
Figure 10B:
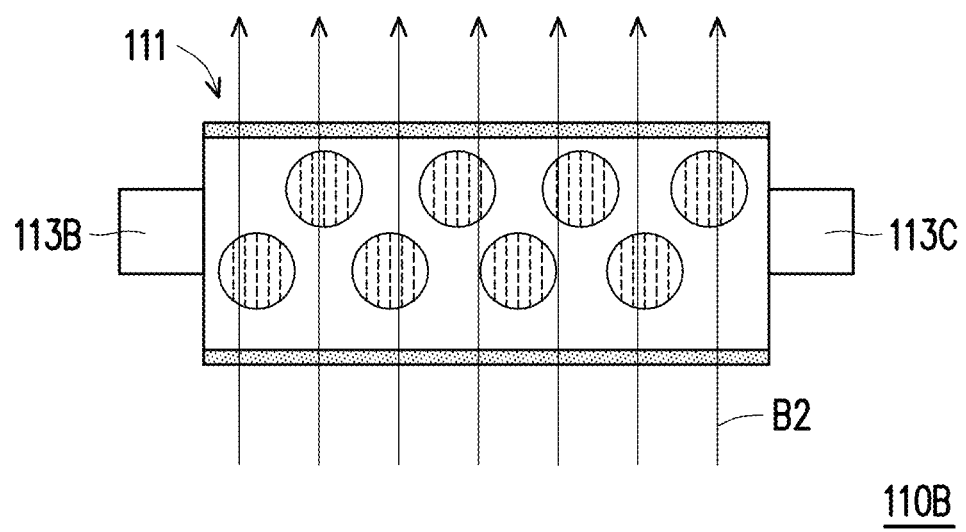

FIG. 9 is a pixel structure of a transparent display that can be applied to the transparent display system of FIG. 4. FIGS. 10A and 10B are partially enlarged cross-sectional schematic diagrams of the transparent display of FIG. 9 in the scattering state and the transparent state, respectively. With reference to FIGS. 9 to 10B, a transparent display 110B includes a plurality of haze adjustable elements 111 and a light emitting display panel 113. Please refer to the above for the types and operation methods of the haze adjustable element 111, and descriptions thereof will be omitted here. The light emitting display panel 113 may include a plurality of light emitting sources, such as organic light emitting diodes, light emitting diodes, micro light emitting diodes, laser or waveguide type light emitting elements, but it is not limited thereto. In the embodiment, the plurality of light emitting sources of the light emitting display panel 113 may include a plurality of first micro light emitting diodes 113A, a plurality of second micro light emitting diodes 113B, and a plurality of third micro light emitting diodes 113C. These light emitting sources are adapted to output light beams of a plurality of colors, and the plurality of haze adjustable elements 111 are disposed in a plurality of light mixing regions M among the plurality of light emitting sources.

In the embodiment, the first micro light emitting diodes 113A, the second micro light emitting diodes 113B, and the third micro light emitting diodes 113C are respectively green micro light emitting diodes, red micro light emitting diodes, and blue micro light emitting diodes. In addition, each pixel P of the light emitting display panel 113 is provided with one first micro light emitting diode 113A, one second micro light emitting diode 113B, one third micro light emitting diode 113C, and one haze adjustable element 111. However, the types of colors, the number of colors, and the arrangement of the micro light emitting diodes included in the light emitting display panel 113 may be changed as needed, and they are not limited to the above case.

As shown in FIG. 10A, when a plurality of micro light emitting diodes are turned on (FIG. 10A only shows the second micro light emitting diodes 113B and the third micro light emitting diodes 113C) to output a light beam B4 and a light beam B5 for generating the display image, the haze adjustable element 111 may be switched to the scattering state. On the other hand, as shown in FIG. 10B, when the display image is not output, the plurality of micro light emitting diodes may be turned off, and the haze adjustable element 111 is switched to the transparent state.

In the embodiment, each of the micro light emitting diodes may emit light laterally. A light beam output from each of the micro light emitting diodes is first transmitted to the haze adjustable element 111 located in the light mixing region M, mixed by the reflection of the haze adjustable element 111, and then output from the transparent display 110B. Under this architecture, the uniform color mixing effect may be achieved so that the transparent display 110B may exhibit truer colors, and the problem that the user can easily perceive the existence of color separation stripes may be improved.

With reference to FIG. 4, the transparent display system 100 may also optionally include other elements, devices, or modules based on various needs. For example, the transparent display system 100 may further include a data capture module 130 for capturing the display information and the background information. The data capture module 130 is coupled to the computation module 120 for transmitting the captured display information and background information to the computation module 120. For example, the data capture module 130 may include the above-described light detecting device.

The data capture module 130 may further capture the foreground reflection light luminance and/or user information based on the needs. The user information may include at least one of the user's identity, location, range of line of sight, gaze location, and user preferences. For example, the data capture module 130 may further include a light field camera and a rangefinder to obtain the above user information.

The user preferences in the user information may include at least one of gender, age, disease, and habits (such as viewing preferences or using preferences). The data capture module 130 may be used to determine the user's gender, age, information about the eyes (such as whether there is vision correction, an eye injury or eye bleeding), habits (such as viewing preferences or using preferences), etc. Alternatively, the transparent display system 100 may further include an input device 140 for the user to input the user preferences. In addition, the computation module 120 is coupled to the input device 140, and the computation module 120 may adjust the threshold range in which the display image can be recognized (for example, the computation module 120 may reduce or enlarge the dot region R1 shown in FIG. 7) based on the user preferences input by the user.

Moreover, the transparent display system 100 may further include a data storage module 150. When the user enters the working range of the transparent display system 100 or when the user uses the transparent display 110, the user's identity may be confirmed by the data capture module 130 (by face recognition, for example), and the user preferences may be obtained by searching a database in the data storage module 150. The data storage module 150 may be coupled to the computation module 120, the data capture module 130, and the input device 140 to store the user information captured by the data capture module 130, a determination program corresponding to the dot region R1 shown in FIG. 7, the user preferences input by the user, etc.

Figure 11:
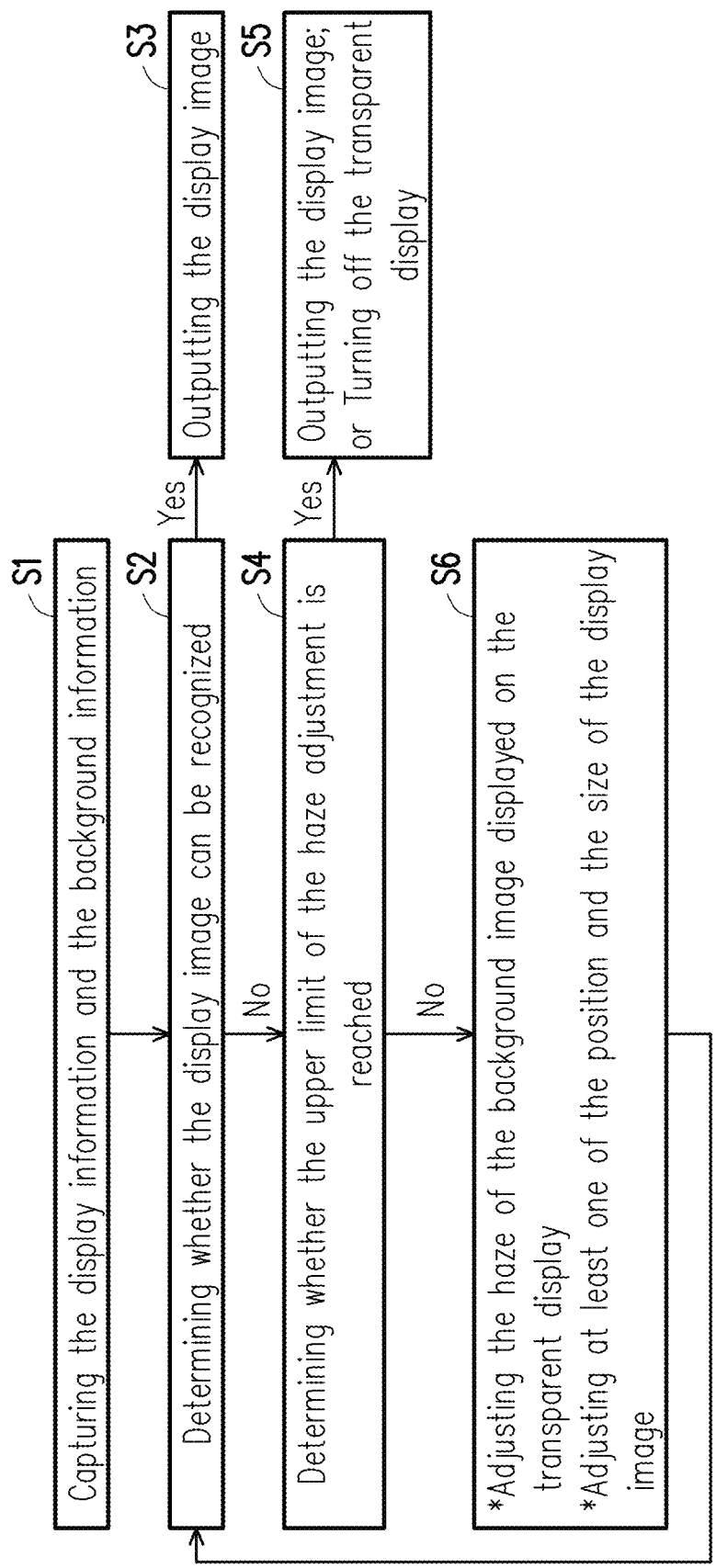
FIGS. 11 to 13 are flowcharts respectively illustrating operation methods of the transparent display system according to various embodiments of the disclosure.
Figure 12:
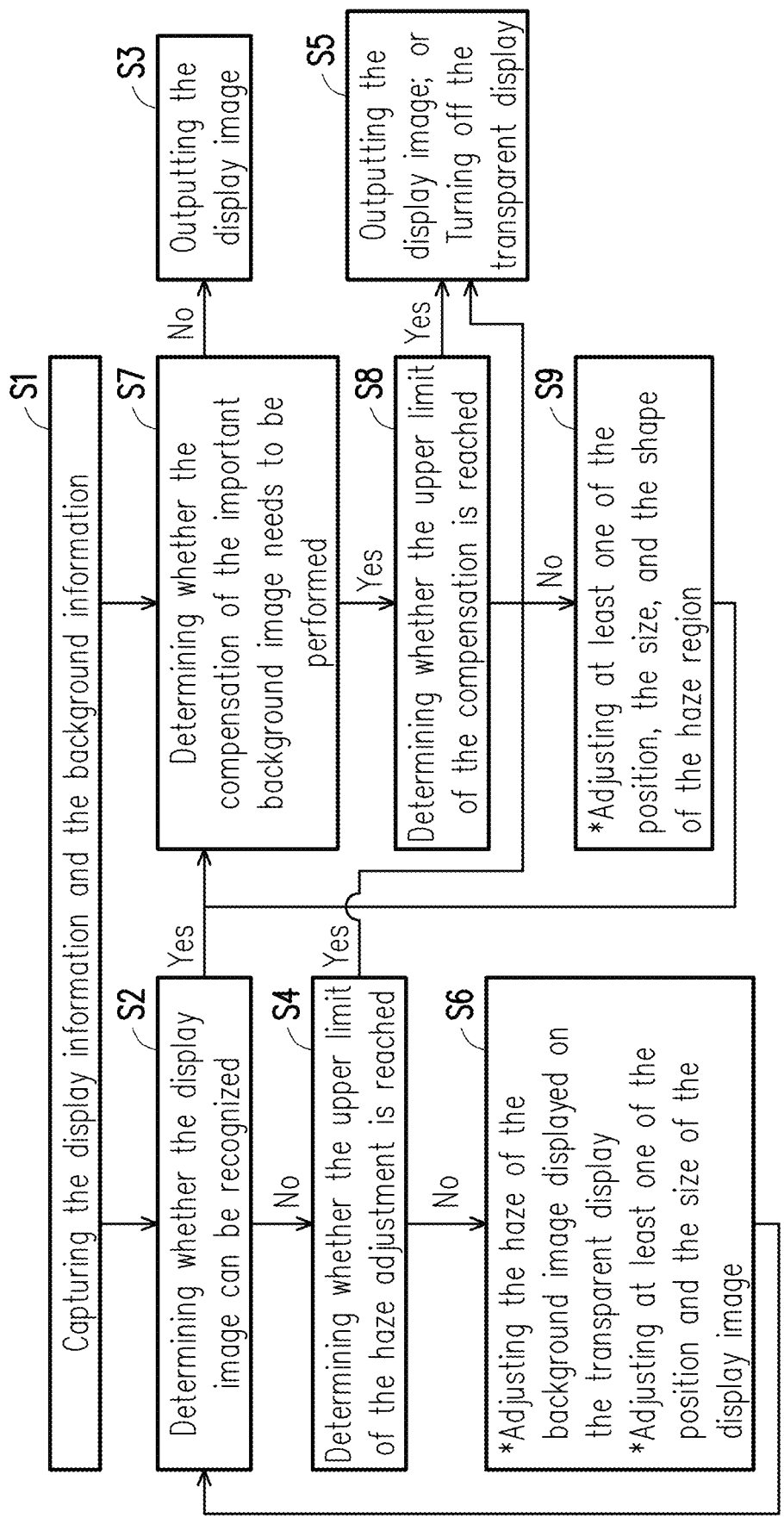
Figure 13:
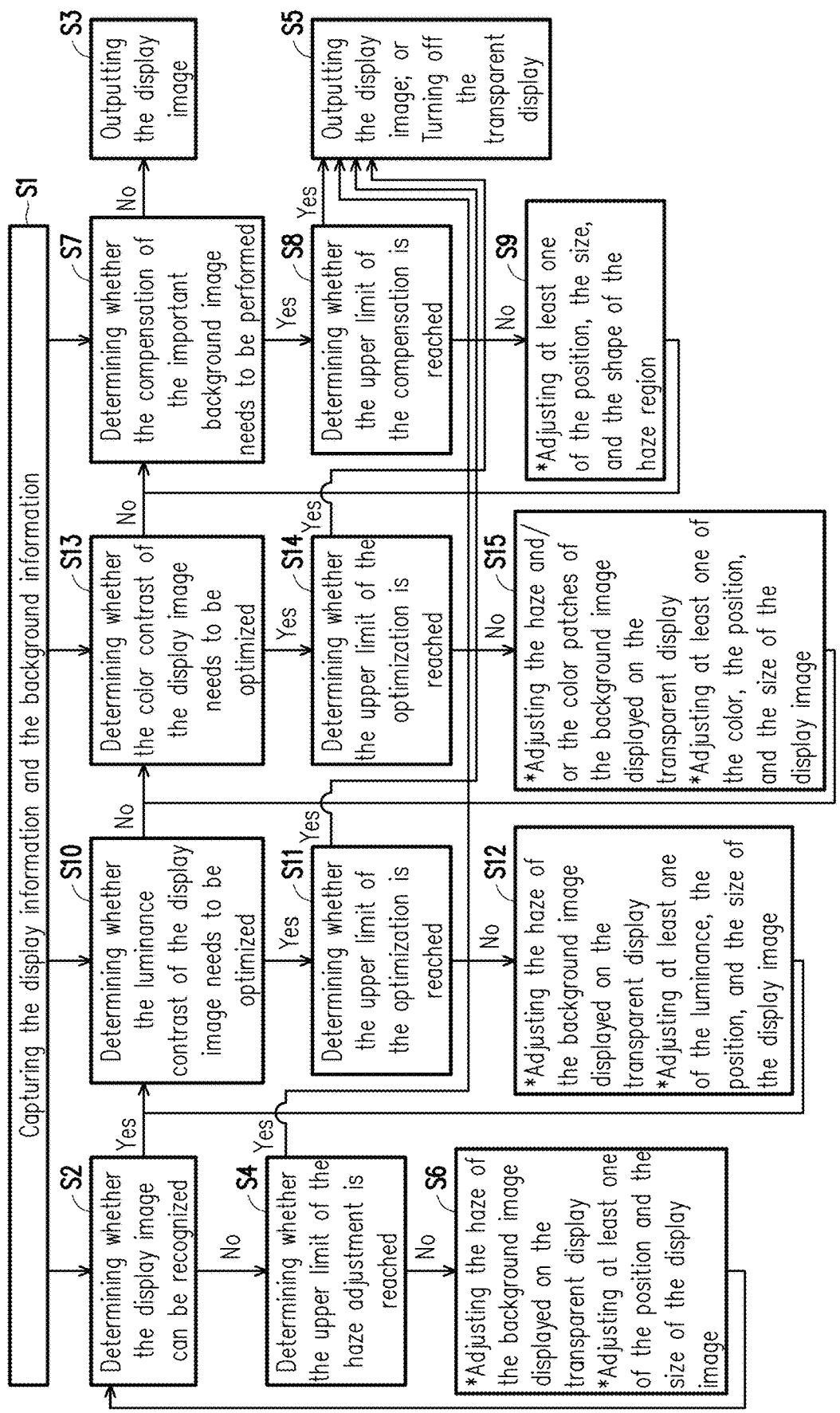

FIGS. 11 to 13 are flowcharts respectively illustrating operation methods of the transparent display system according to multiple embodiments of the disclosure. With reference to FIG. 11, a first operation method of the transparent display system includes the following steps. First, the display information and the background information are captured (Step S1). In this step, the required information, such as (but not limited to) the user information, may also be captured.

Next, it is determined whether the display image displayed on the transparent display can be recognized (Step S2). In this step, the computation module determines whether the display image displayed on the transparent display can be recognized or whether the recognizability is poor (for example, the display image cannot be recognized or the display image is not easily recognized) based on the display information and the background information. For example, the computation module can determine whether the display image displayed on the transparent display can be recognized based on whether the viewing angle and the background luminance fall within the range in which the display image can be recognized (such as the dot region R1 shown in FIG. 7).

If it is determined that the display image can be recognized, the display image is output (Step S3). On the other hand, if it is determined that the recognizability of the display image is poor, it is then determined whether the upper limit of the haze adjustment is reached (step S4). Each haze adjustable element has its upper limit of the haze adjustment. When the haze of the haze adjustable element reaches its upper limit of the haze adjustment, the haze can no longer be increased. Therefore, if it is determined that the upper limit of the haze adjustment is reached, the display image is output or the transparent display is turned off (Step S5). When the display image cannot be clearly recognized even if the upper limit of the haze adjustment is reached, it may be chosen to output the display image that can no longer be optimized or not to output the display image.

On the other hand, if it is determined that the upper limit of the haze adjustment is not reached, the haze of the background image displayed on the transparent display is adjusted, or at least one of the position and the size of the display image is adjusted (Step S6). As described above, the adjustments of the haze of the background image include at least one of adjusting the haze of the haze region of the background image and adjusting the size of the haze region, and the area of the haze region is less than or equal to the area of the background image. In addition, the method of adjusting the haze of the background image may be adjusting the haze of the background image by an algorithm or switching the haze adjustable element between the transparent state and the scattering state by hardware adjustment. Please refer to the above for relevant contents, and descriptions thereof will be omitted here.

With reference to FIG. 12, a second operation method of the transparent display system may further include an important background image compensation determination process (including Steps S7 to S9) in addition to the above-described display image recognizability determination process (including Steps S1 to S6).

The haze adjustment can improve the recognizability of the display image (such as texts or graphics) by adding the haze effect to the whole background image or partial background image (the haze region is smaller than or as large as the background image), wherein the haze region at least partially overlaps the display image. The image added with the haze effect becomes blurred and difficult to recognize (the recognition difficulty varies with the haze degree). If images that are considered important in the background image (such as traffic lights, traffic signs, or warning signs) are obscured by the haze region, it may affect the user's judgment and may even affect the user's safety. Therefore, the second operation method proposes the important background image compensation determination process to solve the above-described problem.

In detail, the display image recognizability determination process and the important background image compensation determination process may be performed synchronously or asynchronously. In the case of an asynchronous performance, the display image recognizability may be determined first and then determine whether the compensation of the important background image needs to be performed. Alternatively, whether the compensation of the important background image needs to be performed may be determined first and then determine the display image recognizability.

In Step S7, it is determined whether the compensation of the important background image needs to be performed. For example, the target object recognition technology may be used to search for the existence of a target image from the background image, such as the traffic lights, traffic signs, or warning signs mentioned above. It is determined whether the region to be displayed of the display image overlaps the target image. If it is determined that the compensation of the important background image does not need to be performed and that the display image can be recognized, the display image is output (Step S3).

On the other hand, if it is determined that the compensation of the important background image needs to be performed, it is determined whether the upper limit of the compensation is reached (step S8). Here, the upper limit of the compensation may be determined by the position, size and/or shape of the haze region. If it is found through computation that the important background image has poor recognizability (for example, the display image cannot be recognized or the display image is difficult to recognize) after the above parameters are adjusted, the display image is output or the transparent display is turned off (step S5).

On the other hand, if it is determined that the upper limit of the compensation is not reached, at least one of the position, the size, and the shape of the haze region is adjusted (Step S9) to improve the recognizability of the important background image. It should be noted that if the results computed by the display image recognizability determination process and the important background image compensation determination process are inconsistent, the intersection of the two results is selected. For example, if the size of the haze region computed by the display image recognizability determination process falls within a range of 10 square millimeters to 20 square millimeters, and the size of the haze region computed by the important background image compensation determination process falls within a range of 10 square millimeters to 15 square millimeters, then it is determined that the size of the haze region falls within the range of 10 square millimeters to 15 square millimeters.

With reference to FIG. 13, a third operation method of the transparent display system may further include a luminance contrast determination process (including Steps S10 to S12) and a color contrast determination process (including Steps S13 to S15) in addition to the above-described display image recognizability determination process (including Steps S1 to S6) and the important background image compensation determination process (including Steps S7 to S9).

A luminance contrast of the display image is the sum of the field luminance and the information luminance divided by the field luminance. That is, if C is used to represent the luminance contrast of the display image, A is used to represent the field luminance, and B is used to represent the information luminance, then C=(A+B)/A. Since the luminance contrast of the display image is affected by the information luminance, the foreground reflection light luminance and the background luminance, even if the parameters (such as size, color and position) of the display image and the foreground reflection light luminance remain unchanged, the luminance contrast of the display image will change as the background luminance varies with the changing brightness of the field, thereby affecting the difficulty of the display image recognition. In addition, when the background image is very complicated (such as a color clutter), it may also affect the difficulty of the display image recognition. Therefore, the third operation method proposes the luminance contrast determination process and the color contrast determination process to solve the above-described problem.

In detail, the above-described four determination processes may be performed synchronously or asynchronously. In the case of an asynchronous performance, the order of performing the four determination processes may be changed as needed.

In Step S10, it is determined whether the luminance contrast of the display image needs to be optimized. For example, it is determined whether the size of the display image falls within a range of the viewing angle of 0.15 degrees to 2.25 degrees and whether the luminance contrast of the display image is greater than or equal to $$1.773 \times e^{-\left(\frac{\theta - 13..95}{22.95}\right)^2} + 1.234 \times e^{-\left(\frac{\theta + 0.2208}{0.4677}\right)^2}$$

(the lower boundary of the luminance contrast) and less than or equal to $$\frac{f(d) \times k}{L_b^{0.5} \times \tan \theta}$$

(the upper boundary of the luminance contrast). If the size of the display image does not fall within the range of the viewing angle of 0.15 degrees to 2.25 degrees, and the luminance contrast of the display image is less than the lower boundary of the luminance contrast or greater than the upper boundary of the luminance contrast, then it is determined whether the upper limit of the optimization is reached (Step S11). Here, the upper limit of the optimization may be determined by the haze of the background image, the luminance of the display image (i.e., the information luminance), the position of the display image, and the size of the display image. If it is found through computation that the luminance contrast cannot be effectively optimized after the above parameters are adjusted, the display image is output or the transparent display is turned off (Step S5).

On the other hand, if it is determined that the upper limit of the optimization is not reached, then the haze of the background image displayed on the transparent display is adjusted or at least one of the luminance, the position, and the size of the display image is adjusted (Step S12) to improve the luminance contrast of the display image.

In Step S13, it is determined whether the color contrast of the display image needs to be optimized. If the color contrast of the display image needs to be optimized, it is determined whether the upper limit of the optimization is reached (Step S14). Here, the upper limit of the optimization may be determined by the haze of the background image, the color patches of the background image, the color of the display image, the position of the display image, and the size of the display image. If it is found through computation that the color contrast cannot be effectively optimized after the above parameters are adjusted, the display image is output or the transparent display is turned off (Step S5).

On the other hand, if it is determined that the upper limit of the optimization is not reached, then the haze and/or the color patches of the background image are adjusted or at least one of the color, the position, and the size of the display image is adjusted (Step S15) to improve the color contrast of the display image.

When it is determined that the display image can be recognized, that the luminance contrast and the color contrast do not need to be optimized, and that the compensation of the important background image does not need to be performed, the display image is output (Step S3). Similarly, if the results computed by the above-described four determination processes are inconsistent, the intersection of the four results is selected.

Figure 14A:
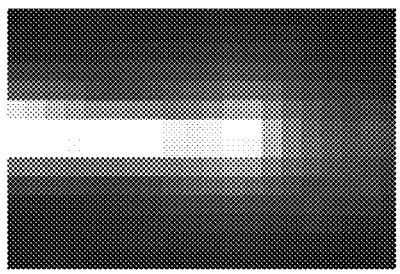
FIGS. 14A to 14H are images corresponding to the operation method of the transparent display system of FIG. 13, respectively.
Figure 14B:
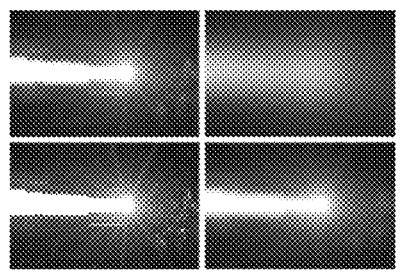
Figure 14C:
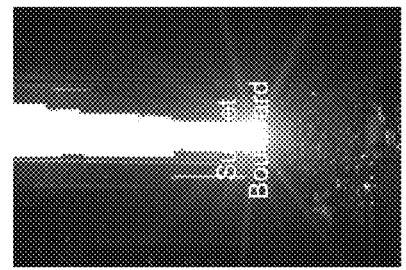
Figure 14D:
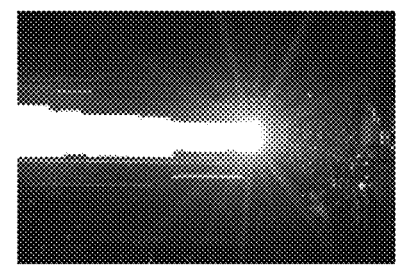
Figure 14E:
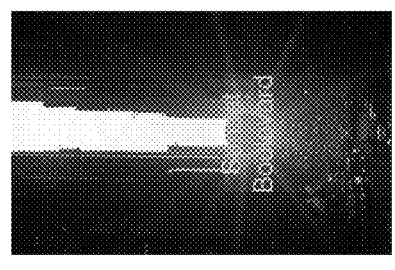
Figure 14F:
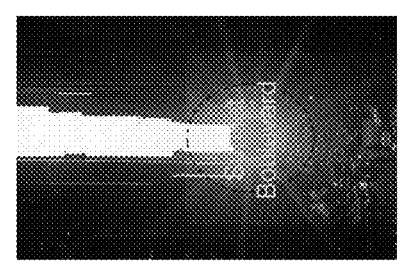
Figure 14G:
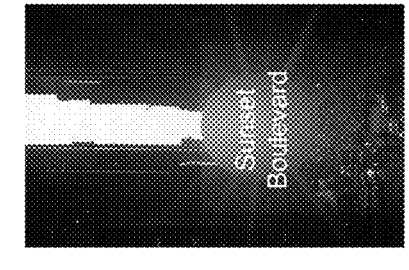
Figure 14H:
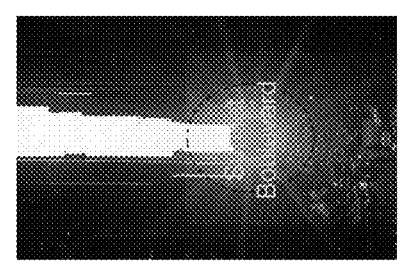

FIGS. 14A to 14H are images corresponding to the operation method of the transparent display system of FIG. 13, respectively. FIG. 14A shows a background image captured by the data capture module and including the sunset with high luminance. FIG. 14B shows a result of overlaying the display image (the text "Sunset Boulevard") and the background image. It can be seen from FIG. 14B that part of the text in the display image has poor recognizability due to overlapping the sun. FIG. 14C shows four results of the background image after the haze adjustments. It can be seen from FIG. 14C that the higher the haze of the background image is, the more blurred the background image is. FIG. 14D shows a luminance analysis performed by the computation module, that is, the luminance of each region of the background image captured by the data capture module. FIG. 14E shows a result of overlaying the display image and the background image processed with the haze region optimization. FIG. 14F shows a chromaticity determination. It can be seen from the four small images of FIG. 14F that texts in different colors have different recognizability on the same background image. FIG. 14G shows a background compensation, such as by reducing the size of the haze region to make the contour of the sun clearer. FIG. 14H shows a final adjustment result. Comparing FIG. 14B with FIG. 14H, it can be found that the display image (the text "Sunset Boulevard," for example) becomes clearer after the above-described adjustment, and the sunset in the background image is clearly visible and becomes less glaring after the above adjustment.

Figure 15A:
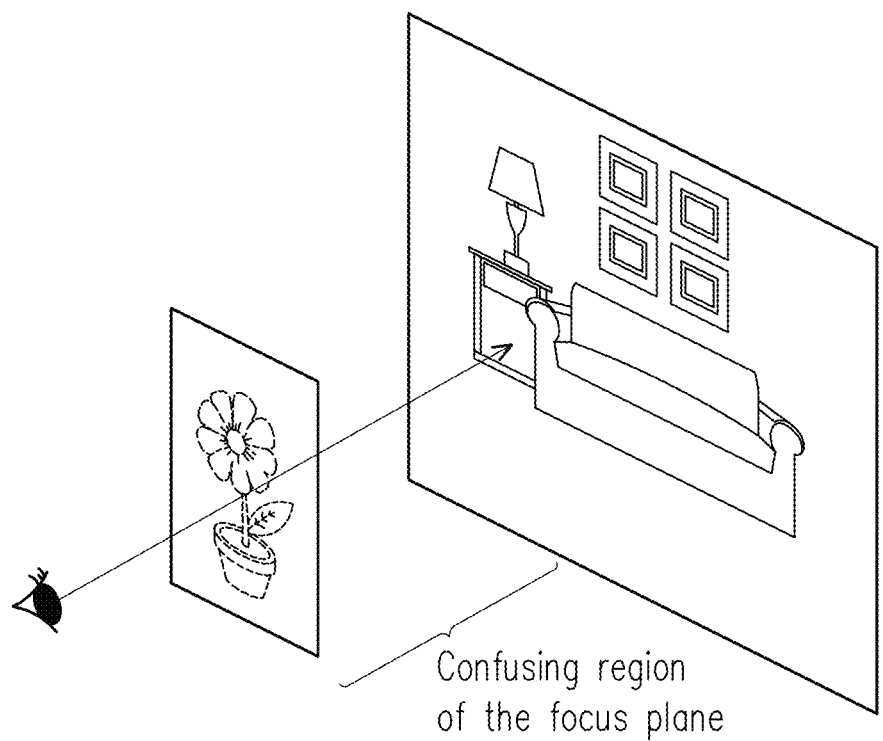
FIGS. 15A and 16A respectively illustrate a case where the display image is not easily clearly focused and a case where the display image can be clearly focused.
Figure 15B:
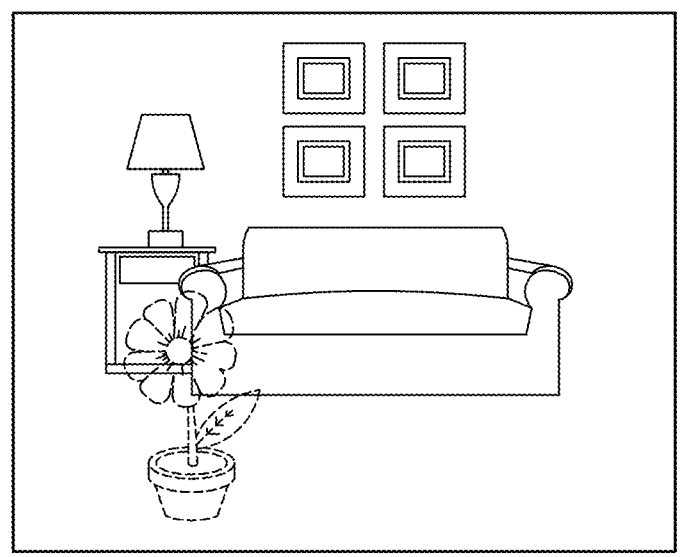
FIGS. 15B and 16B respectively illustrate images in which the background image and the display image are overlaid before and after the partial haze effect is added to the background image displayed on the transparent display.
Figure 16A:
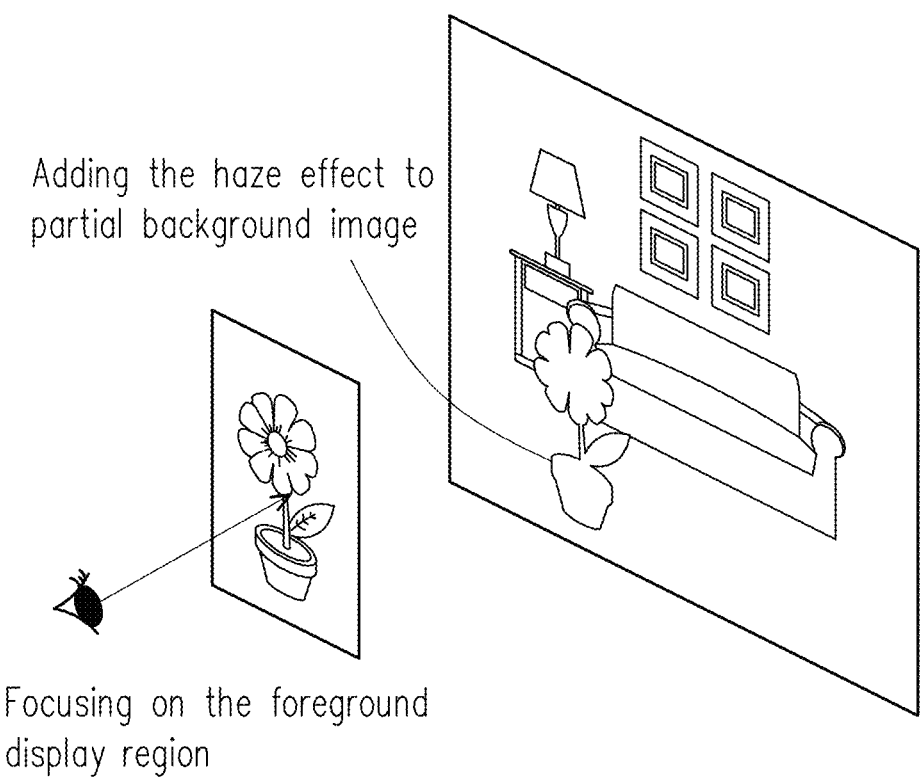
Figure 16B:
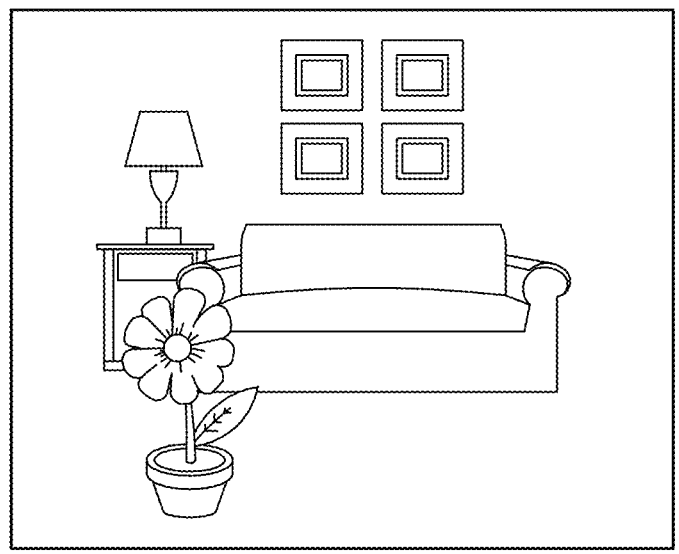

In addition, the haze effect of the background image can make the human eye tend to focus on the foreground display region with a clear image, thereby achieving the effect of improving the user's focusing speed. FIGS. 15A and 16A respectively illustrate a case where the display image is not easily clearly focused and a case where the display image can be clearly focused. FIGS. 15B and 16B respectively illustrate images (images perceived by the human eye) in which the background image and the display image are overlaid before and after the partial haze effect is added to the background image. With reference to FIGS. 15A and 15B, when the background image (such as furniture) and the display image (such as a potted plant) on the transparent display are overlaid, the display image is translucent like a ghost, which makes the focus plane confusing and difficult for the human eye to focus. With reference to FIGS. 16A and 16B, by adding a haze effect to an overlapping region of the background image that is overlapped with the display image (i.e., adding the haze effect to partial background image) and then overlaying the background image and the display image, the display image can obscure the background image located in the overlapping region. In this way, in addition to helping to improve the clarity and sharpness of the display image, it can also make the human eye tend to focus on the display image (the foreground display region), thereby improving the ghost phenomenon and the problem that the user cannot focus easily.

The transparent display system according to an embodiment of the disclosure can improve the recognizability of the display image by adjusting the haze of the background image when determining that the recognizability of the display image is poor. In addition, the operation method of the transparent display system according to an embodiment of the disclosure can determine whether the haze of the background image needs to be adjusted to improve the recognizability of the display image. In addition to improving the recognizability of the display image, adjusting the haze of the background image also helps to improve the boundary range of the reading comfort, thereby achieving the effect of effectively expanding the application fields of the transparent display. In one embodiment, the haze of the background image may be adjusted by an algorithm or hardware adjustment. If the way of the hardware adjustment is adopted, the relative disposition relationship between the haze adjustable elements and the display panel may be controlled to increase the utilization of light or to achieve the uniform color mixing effect and improve the problem that the user can easily perceive the existence of color separation stripes. In another embodiment, the clarity, sharpness, and recognizability of the display image may be improved by the haze region. In yet another embodiment, in addition to optimizing the recognizability of the display image, the computation module may further optimize the luminance contrast of the display image, optimize the color contrast of the display image, and/or perform the compensation of the important background image.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and their equivalents and not by the above detailed descriptions.

What is claimed is:

1. A transparent display system, comprising:
a transparent display; and
a computation circuit coupled to the transparent display, wherein the computation circuit determines whether a display image displayed on the transparent display can be recognized based on display information and background information and adjusts a haze of a background image displayed on the transparent display when determining that recognizability of the display image is poor,
wherein a viewing angle of the display image is $\theta$, background luminance of the background image is $L_b$, and the recognizability of the display image is determined to be poor when $\theta$ does not satisfy Equation 1 or when $L_b$ does not satisfy Equation 2, $$0.15 \le \theta \le 2.25 \qquad \text{Equation 1}$$

$$\left(\frac{\tan(\theta) \times L_i}{f(d) \times k}\right)^2 \le L_b \le \qquad \text{Equation 2}$$
$$L_i / \left[1.773 \times e^{-\left(\frac{\theta - 13.95}{22.95}\right)^2} + 1.234 \times e^{-\left(\frac{\theta + 0.2208}{0.4677}\right)^2}\right]$$

where $$\theta = \tan^{-1}\left(\frac{w}{d}\right),$$

w is a width of the display image, d is a distance between a user and the display image, $L_i$ is information luminance of the display image, k falls within a range of 8.4 to 30.8, and $f(d) = -0.1734 \times d^3 + 0.6648 \times d^2 + 0.6372 \times d + 0.9788$.

2. The transparent display system according to claim 1, wherein the transparent display comprises:
a projection display;
a transmissive display; or
a photographic display.

3. The transparent display system according to claim 1, wherein an upper boundary of $L_b$ is defined by Equation 3 after the haze of the background image displayed on the transparent display is adjusted, $$L_b \le \qquad \text{Equation 3}$$
$$L_i / \left\{\left[1.773 \times e^{-\left(\frac{\theta - 13.95}{22.95}\right)^2} + 1.234 \times e^{-\left(\frac{\theta + 0.2208}{0.4677}\right)^2}\right] \times [1 - H]\right\}$$

where H is the haze of the background image after the haze of the background image displayed on the transparent display is adjusted.

4. The transparent display system according to claim 1, wherein the computation circuit stores an algorithm, and a method for adjusting the haze of the background image displayed on the transparent display comprises:
adjusting at least one of a color and a grayscale of the background image displayed on the transparent display based on the algorithm.

5. The transparent display system according to claim 1, wherein the transparent display comprises:
a haze adjustable element, wherein a method of adjusting the haze of the background image displayed on the transparent display comprises changing a voltage applied to the haze adjustable element so that the haze adjustable element is switched between a transparent state and a scattering state; and
a transmissive display panel disposed on the haze adjustable element, wherein a background light beam passes through the haze adjustable element and the transmissive display panel sequentially and is transmitted to eyes of a user.

6. The transparent display system according to claim 1, wherein the transparent display further comprises:
a plurality of haze adjustable elements, wherein a method of adjusting the haze of the background image displayed on the transparent display comprises changing a voltage applied to at least one of the plurality of haze adjustable elements so that the at least one haze adjustable element is switched between a transparent state and a scattering state; and a light emitting display panel comprising a plurality of light emitting sources adapted to output light beams of a plurality of colors, wherein the plurality of haze adjustable elements are disposed in a plurality of light mixing regions among the plurality of light emitting sources.

7. The transparent display system according to claim 1, wherein adjusting the haze of the background image comprises at least one of adjusting a haze of a haze region of the background image and adjusting a size of the haze region, an area of the haze region is less than or equal to an area of the background image, and the haze region at least partially overlaps the display image.

8. The transparent display system according to claim 1, when determining that the recognizability of the display image is poor, further performing:
adjusting at least one of a position and a size of the display image.

9. The transparent display system according to claim 1, wherein the computation circuit further determines at least one of the following based on the display information and the background information:
whether compensation of the background image needs to be performed;
whether a luminance contrast of the display image needs to be optimized; and
whether a color contrast of the display image needs to be optimized.

10. The transparent display system according to claim 1, further comprising:
a data capture circuit adapted to capture the display information and the background information.

11. The transparent display system according to claim 1, wherein adjusting the haze of the background image displayed on the transparent display comprises adding a haze effect to an overlapping region of the background image that is overlapped with the display image, the display image obscuring the background image located in the overlapping region.

12. An operation method of a transparent display system, comprising:
capturing display information and background information;
determining whether a display image displayed on a transparent display can be recognized based on the display information and the background information;
outputting the display image if it is determined that the display image can be recognized; and
adjusting a haze of a background image displayed on the transparent display if it is determined that recognizability of the display image is poor,
wherein a viewing angle of the display image is θ, background luminance of the background image is $L_b$, and the recognizability of the display image is determined to be poor when θ does not satisfy Equation 1 or when $L_b$ does not satisfy Equation 2, $$0.15 \leq \theta \leq 2.25 \quad \text{Equation 1}$$

$$\left(\frac{\tan(\theta) \times L_i}{f(d) \times k}\right)^2 \leq L_b \leq \quad \text{Equation 2}$$

$$L_i / \left[1.773 \times e^{-\left(\frac{\theta-13.95}{22.95}\right)^2} + 1.234 \times e^{-\left(\frac{\theta+0.2208}{0.4677}\right)^2}\right]$$

where $$\theta = \tan^{-1}\left(\frac{w}{d}\right),$$

w is a width of the display image, d is a distance between a user and the display image, $L_i$ is information luminance of the display image, k falls within a range of 8.4 to 30.8, and $f(d) = -0.1734 \times d^3 + 0.6648 \times d^2 + 0.6372 \times d + 0.9788$.

13. The operation method of the transparent display system according to claim 12, wherein a method of outputting the display image comprises:
projecting the display image onto a light transmitting substrate by a projection device;
displaying the display image by a transmissive display panel; or
capturing the background information by a data capture module and outputting the display image and the background image by a display panel.

14. The operation method of the transparent display system according to claim 12,
wherein an upper boundary of Lb is defined by Equation 3 after the haze of the background image displayed on the transparent display is adjusted, $$L_b \leq \quad \text{Equation 3}$$

$$L_i / \left\{\left[1.773 \times e^{-\left(\frac{\theta-13.95}{22.95}\right)^2} + 1.234 \times e^{-\left(\frac{\theta+0.2208}{0.4677}\right)^2}\right] \times [1-H]\right\}$$

where H is the haze of the background image after the haze of the background image displayed on the transparent display is adjusted.

15. The operation method of the transparent display system according to claim 12, wherein a method for adjusting the haze of the background image displayed on the transparent display comprises:
adjusting at least one of a color and a grayscale of the background image displayed on the transparent display.

16. The operation method of the transparent display system according to claim 12, wherein a method for adjusting the haze of the background image displayed on the transparent display comprises:
outputting the display image by a transmissive display panel; and
switching a haze adjustable element between a transparent state and a scattering state, wherein a background light beam passes through the haze adjustable element and the transmissive display panel sequentially and is transmitted to eyes of a user.

17. The operation method of the transparent display system according to claim 12, wherein adjusting the haze of the background image comprises at least one of adjusting a haze of a haze region of the background image and adjusting a size of the haze region, an area of the haze region is less than or equal to an area of the background image, and the haze region at least partially overlaps the display image.

18. The operation method of the transparent display system according to claim 12, when determining that the recognizability of the display image is poor, further performing:
adjusting at least one of a position and a size of the display image.

19. The operation method of the transparent display system according to claim 12, further comprising:

determining whether compensation of the background image needs to be performed;

determining whether a luminance contrast of the display image needs to be optimized; and determining whether a color contrast of the display image needs to be optimized.

20. The operation method of the transparent display system according to claim 12, wherein adjusting the haze of the background image displayed on the transparent display comprises adding a haze effect to an overlapping region of the background image that is overlapped with the display image, the display image obscuring the background image located in the overlapping region.

* * * * *